No. 808,241. PATENTED DEC. 26, 1905.
F. H. JEANNIN.
END CONNECTION FOR DYNAMO ELECTRIC MACHINES.
APPLICATION FILED MAY 25, 1904.

Witnesses.

Inventor:
Frank H. Jeannin.
by
Atty.

UNITED STATES PATENT OFFICE.

FRANK H. JEANNIN, OF SCHENECTADY, NEW YORK, ASSIGNOR TO GENERAL ELECTRIC COMPANY, A CORPORATION OF NEW YORK.

END CONNECTION FOR DYNAMO-ELECTRIC MACHINES.

No. 808,241.        Specification of Letters Patent.        Patented Dec. 26, 1905.

Application filed May 25, 1904. Serial No. 209,666.

*To all whom it may concern:*

Be it known that I, FRANK H. JEANNIN, a citizen of the United States, residing at Schenectady, county of Schenectady, State of New York, have invented certain new and useful Improvements in End Connections for Dynamo-Electric Machines, of which the following is a specification.

My invention relates to dynamo-electric machines; and its object is to provide a novel form of end connection for large and closely-spaced conductors which shall facilitate the construction of machines employing such conductors. In many types of machines—such, for example, as in the stator of a low-voltage alternating-current motor of large capacity—the winding is commonly formed of heavy bars which are placed in closely-spaced slots. The size of the bars renders it impracticable to employ former-wound coils, and consequently it is necessary to join the separate conductors by suitable end connections. Since the current capacity is high, the end connections must make good electrical contact with the conductors, and it has been found that the most satisfactory construction consists in riveting the end connections to the conductors and then soldering. When the conductors are closely spaced, as is frequently the case, it is impossible to insert the rivets when the conductors are in position, and this involves drawing out each conductor, so that it extends beyond the adjacent conductors in order that the rivet may be passed through it.

My invention consists in slotting out the ends of the conductors, so as to enable the rivets to be formed in the end connections before assembling and then slipped into place without disturbing the position of the conductor.

My invention will best be understood by reference to the accompanying drawings, in which—

Figure 1:
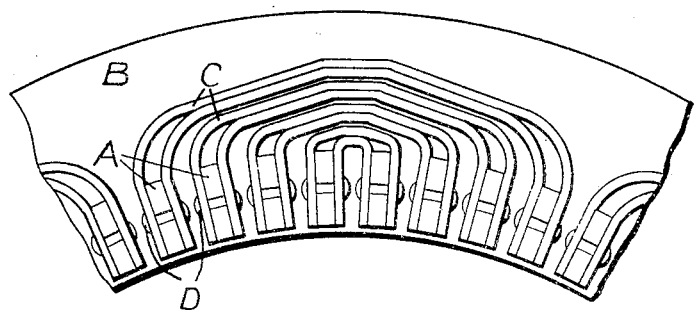
Figure 2:
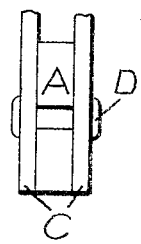
Figure 3:
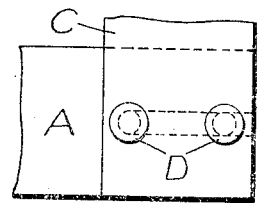

Figure 1 shows an end view of a portion of the stator of a dynamo-electric machine with end connections arranged in accordance with my invention. Fig. 2 shows an enlarged detail view of a single conductor and end connection, and Fig. 3 shows a side view of the same.

In Fig. 1, A A represent conductors formed of heavy bars and inserted in holes or slots in the member B.

C C represent the end connections which are secured to the conductors A by the rivets D. Each end connection consists of two parallel conducting-strips which are riveted to opposite sides of the conductor, thereby utilizing the contact-surface of both sides. In order to enable the rivets to be slipped into place without drawing out the conductor, the end of each conductor is slotted, as shown in dotted lines in Fig. 3. By means of this construction the rivets may be formed in the end connection before assembling and then slipped into place in the ends of the conductors. The rivets may then be tightened by means of a clamping-tool and the connection soldered to further improve the electrical contact.

What I claim as new, and desire to secure by Letters Patent of the United States, is—

1. In a dynamo-electric machine, conductors slotted at their ends, rivets adapted to enter said slots, and end connections for said conductors engaged by said rivets.

2. In a dynamo-electric machine, conductors slotted at their ends, and end connections for said conductors provided with rivets adapted to enter said slots and secured to said conductors by said rivets.

3. In a dynamo-electric machine, conductors, and end connections riveted thereto, said conductors being slotted at their ends to receive the rivets.

4. In a dynamo-electric machine, conductors, and end connections each formed of parallel conducting-strips riveted to opposite sides of a conductor, said conductors being slotted at their ends to receive the rivets.

5. In a dynamo-electric machine, a core having closely-spaced slots, conductors in said slots, and end connections riveted to said conductors, said conductors being slotted at their ends to receive the rivets.

6. In a dynamo-electric machine, a core having closely-spaced slots, conductors carried in said slots, and end connections each formed of parallel conducting-strips riveted to opposite sides of a conductor, said conductors being slotted at their ends to receive the rivets.

In witness whereof I have hereunto set my hand this 24th day of May, 1904.

FRANK H. JEANNIN.

Witnesses:
    G. C. HOLLISTER,
    HELEN ORFORD.